3,394,995
PROCESS FOR THE RECOVERY OF BOROHYDRIDES FROM SOLUTIONS THEREOF

Harry Kloepfer, Frankfurt am Main, and Helmut Knorre, Hainstadt am Main, Germany, assignors to Deutsche Gold- und Silber - Scheideanstalt vormals Roessler, Frankfurt am Main, Germany
No Drawing. Filed Mar. 3, 1966, Ser. No. 531,343
Claims priority, application Germany, Mar. 5, 1965, D 46,697
5 Claims. (Cl. 23—302)

The invention relates to a process for the recovery of borohydrides from solutions thereof in suitable solvents, such as, for example, liquid ammonia, lower aliphatic amines or polyethers, especially diethylene glycol-dimethyl ether, which renders it possible to recover the borohydrides in a free flowing solvent free granular and substantially dust free form with simultaneous quantitative recovery of the solvent.

The known processes for recovery of purified alkali metal borohydrides, such as, sodium borohydrides, in general include an extraction of the borohydride from the usually low percentage crude products with a known solvent of the type indicated above. In order to recover the solid purified borohydride from the resulting extract it is usually necessary that it be evaporated down to dryness. When diethylene glycol dimethyl ether (diglyme) is used as the solvent, it is also possible to make use of the dependency of the solubility of $NaBH_4$ in this solvent on temperature and crystallize the $NaBH_4$ from such solution. The disadvantages of this process, however, are that in view of the relatively high boiling point of 162° C. of the diglyme it is very difficult to remove it and recover it completely from both the borohydride, as well as the extraction residue.

Boiling down of a solution of $NaBH_4$ in a low boiling solvent, such as, for example, n-propyl amine, nevertheless, is also subject to difficulties, especially, when value is placed upon the quantitative recovery of the expensive solvent. In the simplest case the boiling down of the solution is effected by heating the solution to boiling in a stirring vessel and condensing the solvent which distills off in a condenser connected to such vessel. Difficulties occur in this procedure, above all, during the transition stage from the liquid to the solid state in that the resulting slurry of crystals tend to spatter despite stirring and the $NaBH_4$ sticks fast to the walls and cover of the vessel and can only be removed therefrom with great difficulty. When large quantities are to be boiled down, the stirring of the very viscous slurry towards the end of the procedure becomes very difficult. As a result the quantity of solution which can be boiled down in one operation is limited. These difficulties could be overcome to some extent if the boiling down was accomplished with the aid of known drum driers, spray driers or similar apparatus. All of such processes, however, lead to very non-uniform products which in addition to containing much fine powdery material also contain larger agglomerations and, as such, are not very agreeable to handle by the user.

The object of the present invention is to provide a process for the recovery of borohydrides from their solutions, either derived from pure borohydrides or from crude borohydride products, by extraction with solvents and separating off the insolubles, which renders it possible to recover such borohydrides in a free flowing, solvent free granular and substantially dust free state.

The essence of the process according to the invention is that the solution of the borohydride in a suited solvent is boiled down to dryness at a pressure which may range from subatmospheric to superatmospheric while practically avoiding passing through the transition stage from the liquid to the solid state by continuously dropping the solution onto a moving bed of solid borohydride particles maintained at a temperature over the boiling point of the solvent at the ambient pressure so that the solvent is evaporated instantaneously. Preferably, the temperature maintained in the moving bed of solid borohydride particles is about 10 to 30° C. above the boiling point of the solvent at the pressures employed in order to expedite the entire boiling down process but lower temperatures can be employed down to that of the boiling point of the solvent at the cost of lowering the throughput of the apparatus. Solvents which can be employed for the borohydride solvents in general are such solvents as have sufficient solvent capacity for the borohydride in question (at least about 1%) and which are inert with respect to the borohydride and do not tend to cause it to decompose in the temperature range required for the treatment. Expediently, a solvent is selected which has the highest solvent capacity for the borohydride and which does not have too high a boiling point in order that the energy requirements for its vaporization are kept as low as possible. If it is necessary to use a solvent with a high boiling point, it is expedient to operate at subatmospheric pressures.

The process according to the invention is not only suited for recovering borohydrides from extracts thereof, obtained in the extraction of crude borohydride products, after separation from insoluble by-products, but also in order to convert prepurified borohydride products into the desired free flowing dust free granular form.

The following examples will serve to illustrate the process according to the invention.

Example 1

A sufficient quantity of fine grained dry $NaBH_4$ was placed in a steam heated vessel provided with anchor stirrers so that the bottom of the vessel as well as the connecting arm of the anchor stirrer were covered and heated while stirring under a nitrogen atmosphere to a temperature of 70–80° C. Thereupon, a solution of $NaBH_4$ in n-propyl amine was continuously dropped on the heated flowing bed of solid $NaBH_4$ particles while maintaining such bed at the temperature indicated. The solvent n-propyl amine vaporized off instantaneously and the $NaBH_4$ remaining as the residue deposited on the preheated solid $NaBH_4$ particles. An fine or coarse grained product can be attained depending upon the stirring speed and temperature employed. The vaporized solvent was condensed with practically quantitative recovery. In order to remove the last traces of solvent from the granular product it was heated under vacuum.

The following table indicates the difference between the product thus obtained (product A) and one (product B) obtained by normal boiling down of the solution in a stirring vessel:

TABLE

| Grain size distribution | Product | |
|---|---|---|
| | A ca. 550 g./l. | B ca. 370 g./l. |
| >1.5 mm | 0.0% | 7.1% |
| 1.5–0.75 mm | 6.0% | 7.1% |
| 0.75–0.43 mm | 54.0% | 8.3% |
| 0.43–0.25 mm | 28.0% | 5.3% |
| 0.25–0.20 mm | 4.0% | 3.0% |
| 0.20–0.15 mm | 6.0% | 30.0% |
| <0.15mm | 2.0% | 39.2% |

Example 2

40 g. of $LiBH_4$ (85%), obtained by metathesis, were dissolved in a flask in 2000 ml. of diethyl ether. The impurities which did not dissolve ($NaBH_4$, $LiCl$ and $NaCl$) were filtered off and the clear $LiBH_4$ placed in a dropping funnel. 100 g. of dry fine grained $LiBH_4$ (97.5%) were placed in a three necked flask provided with a crescent stirrer and connected to a condenser and receiver, and preheated in such vessel to 50° C. under dry nitrogen while stirring. Then the clear $LiBH_4$ solution was dropped from the separating funnel onto the stirred bed of $LiBH_4$ while maintaining the bed temperature of 50° C. The solvent ether vaporized immediately. The $LiBH_4$ product obtained was a free flowing fine grained granulate. The total $LiBH_4$ content in the product was 97.7%. The yield was 93% of theory.

According to a very expedient embodiment of the invention the continuously moving bed of preheated borohydride is maintained in an inclined heated rotary tube which is to be heated zonewise to different temperatures. The bed of preheated borohydride granules is maintained in constant motion in said tube by rotation of the tube. Such bed at the inlet end of the tube is maintained at the minimum temperature over the boiling point of the solvent of the borohydride solution supplied thereto at such inlet end required for the instantaneous vaporization of such solvent, whereas at the discharge end of such tube the bed is maintained at the higher temperature required for driving out the last solvent residues. The borohydride solution is continuously dropped onto the moving bed at the inlet end of the rotating tube whereupon the solvent evaporates immediately with deposit of the solid borohydride residue on the borohydride particles of the bed. The product which is already solid and to a far reaching degree a dry product continuously advances to the hotter zone at the discharge end of the rotating tube where it is freed of the last solvent residues. The solvent vapors expediently are passed countercurrently to the advancing borohydride with the aid of a light stream of inert gas.

The purity of the products obtained according to the process of the invention depends upon the purity of the solution which is boiled down. No decrease in purity occurs during the process itself. Normally the alkali metal borohydride content lies between about 95 and 98.5%. In view of the granular nature of the products they are easy to handle. They can be poured out of vessels practically in the same manner as liquids and therefore are easy to measure out. An especially stable and regular form of the small granular beads can be attained by adding very small quantities of water to the solution to be boiled down, about 0.1–0.2% with reference to such solution. This expedient causes an intermediate hydrate formation which, upon boiling down of the solution, leads to a sintering and thereby to a glazelike surface of the granules.

The products according to the invention in view of their smooth surfaces are also less sensitive to atmospheric moisture than powdered products which often lump together, when stored in bottles or other containers, after such containers have been opened a number of times. If the product according to the invention is to be made even less sensitive to moisture, it is possible in batchwise operation of the process according to the invention to add a small quantity of one of the known water soluble impregnating agents to the extract before conclusion of the boiling off process, which separates out on the granules produced as the solvent is vaporized off and provides a protective coating on the crystal structure of the granules. It furthermore is possible to add catalysts and materials which react with borohydrides upon dissolution in water.

We claim:

1. A method of recovery of a free flowing substantially dust free granular borohydride product from a solution of such borohydride in a volatile organic solvent which is inert with respect to said borohydride which comprises dropping said solution onto a moving bed of solid particles of said borohydride maintained at a temperature above the boiling point of the solvent at the ambient pressure, the rate of supply of the solution being such as to effect substantial instantaneous evaporation of the solvent in said solution upon contact with the bed with deposit of the borohydride content of the solution upon the heated granules.

2. The process of claim 1 in which said borohydride is an alkali metal borohydride and the temperature of said moving bed of particles of said borohydride is about 10 to 30° C. above the boiling point of the solvent at the ambient pressure.

3. The process of claim 2 in which about 0.1 to 0.2% by weight of water is added to the borohydride solution supplied to the moving bed calculated with reference to the solution.

4. The process of claim 2 in which said borohydride is sodium borohydride.

5. The process of claim 1 in which said borohydride solution is a solution of $NaBH_4$ in n-propyl amine and the moving bed is heated to about 70–80° C.

References Cited

UNITED STATES PATENTS

| 1,692,286 | 11/1928 | Brogden. | |
| 2,534,533 | 12/1950 | Schlesinger | 23—361 |
| 2,856,260 | 10/1958 | Bragdon | 23—361 |
| 2,963,405 | 12/1960 | Seemuller | 23—361 |

NORMAN YUDKOFF, *Primary Examiner.*

G. P. HINES, *Assistant Examiner.*